(12) United States Patent
Walker et al.

(10) Patent No.: US 9,037,083 B2
(45) Date of Patent: May 19, 2015

(54) COMMUNICATIONS DEVICE INCLUDING RADIO FREQUENCY (RF) SIGNAL BLOCKING LAYER FOR NEAR-FIELD COMMUNICATION (NFC) DEVICE AND RELATED METHODS

(71) Applicant: BLACKBERRY LIMITED, Waterloo (CA)

(72) Inventors: David Ryan Walker, Waterloo (CA); Jason Tyler Griffin, Kitchener (CA); Steven Henry Fyke, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

(21) Appl. No.: 14/149,464

(22) Filed: Jan. 7, 2014

(65) Prior Publication Data

US 2014/0120831 A1     May 1, 2014

Related U.S. Application Data

(63) Continuation of application No. 12/974,395, filed on Dec. 21, 2010, now Pat. No. 8,655,274.

(51) Int. Cl.
*H04B 5/00* (2006.01)
*H04W 12/08* (2009.01)
*G06K 19/073* (2006.01)
*H04W 4/00* (2009.01)
*H05K 13/00* (2006.01)

(52) U.S. Cl.
CPC ......... *H04W 12/08* (2013.01); *G06K 19/07327* (2013.01); *H04W 4/008* (2013.01); *H05K 13/0023* (2013.01)

(58) Field of Classification Search
CPC .......................................................... H04B 5/00
USPC ............................................. 455/41.1, 90.2
See application file for complete search history.

(56) References Cited

U.S. PATENT DOCUMENTS 5,635,702 A * 6/1997 Monicault ..................... 235/492
6,425,523 B1 * 7/2002 Shem-Ur et al. ............. 235/380
6,506,475 B1 * 1/2003 Hill ............................... 428/194

(Continued)

FOREIGN PATENT DOCUMENTS

GB     2419781     5/2006

OTHER PUBLICATIONS

Karjoth et al. "Disabling RFID Tags with Visible Confirmation: Clipped Tags Are Silenced" WPES'05, Nov. 2005, pp. 1-4.

(Continued)

*Primary Examiner* — April G Gonzales
(74) *Attorney, Agent, or Firm* — Guntin & Gust, PLC; Andrew Gust (57) ABSTRACT

A communications device may include a near-field communication (NFC) circuit device, and a radio frequency (RF) signal blocking member adhesively coupled with the NFC device. The RF signal blocking member may be configured to block RF signal communication by the NFC device while coupled therewith. The RF signal blocking member may comprise an electrical conductor. In accordance with an example, the RF signal blocking member may comprise a frangible layer. In another example, a pressure sensitive adhesive layer may be included for adhesively securing the RF signal blocking member with the NFC device.

23 Claims, 7 Drawing Sheets

(56) References Cited

U.S. PATENT DOCUMENTS

| | | | |
|---|---|---|---|
| 6,676,021 B1* | 1/2004 | Luski et al. | 235/491 |
| 7,087,291 B2* | 8/2006 | Hill | 428/194 |
| RE40,024 E* | 1/2008 | Hill | 428/194 |
| 8,160,636 B2* | 4/2012 | Tadokoro | 455/550.1 |
| 2006/0290501 A1* | 12/2006 | Hammad et al. | 340/572.1 |
| 2009/0026751 A1* | 1/2009 | Rancien et al. | 281/29 |
| 2009/0081943 A1* | 3/2009 | Dobyns et al. | 455/1 |
| 2011/0062243 A1* | 3/2011 | Heusmann et al. | 235/492 |
| 2011/0275315 A1* | 11/2011 | Dembo et al. | 455/41.1 |

OTHER PUBLICATIONS

Paus "Near Field Communication in Cell Phones" Seminararbeit Ruhr-Universitat Bochum: Jul. 2007, pp. 1-24.

"RFID Shield" http://www.rfid-shield.com/products.php, downloaded Apr. 2010, 1 pg.

* cited by examiner

COMMUNICATIONS DEVICE INCLUDING RADIO FREQUENCY (RF) SIGNAL BLOCKING LAYER FOR NEAR-FIELD COMMUNICATION (NFC) DEVICE AND RELATED METHODS

TECHNICAL FIELD

This application relates to the field of communications, and more particularly, to communications devices and related methods that use near-field communication (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near-field communication (NFC) chips. NFC technology is used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters. NFC circuitry may also be implemented in other communications devices, such as NFC tags, for example.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a communications device is disclosed herein which may include a near-field communication (NFC) circuit device, and a radio frequency (RF) signal blocking layer adhesively coupled with the NFC circuit device. The RF signal blocking layer may be configured to block RF signal communication by the NFC circuit device while coupled therewith. As such, the RF signal blocking layer may advantageously be used to prevent communication with the NFC circuit device prior to purchasing the communications device at a store, etc., for enhanced security and privacy.

More particularly, the RF signal blocking layer may comprise an electrical conductor. In accordance with an example embodiment, the RF signal blocking layer may comprise a frangible layer. In another example embodiment, a pressure-sensitive adhesive layer may be included for adhesively securing the RF signal blocking layer to the NFC circuit device.

The NFC circuit device may include a package and NFC circuitry may be carried by the package, and the communications device may further include a wireless communications circuit carried by the package. By way of example, the NFC circuit device may comprise active NFC circuitry or passive NFC circuitry, and an antenna coupled thereto.

A similar communications device may include a NFC circuit device, an antenna coupled to the NFC circuit device, and an RF signal blocking dielectric layer removably positioned between the NFC circuit device and the antenna. The RF signal blocking dielectric layer may be configured to block RF signal communication between the NFC circuit device and the antenna when positioned therebetween, and upon removal permit RF signal communication between the NFC circuit device and the antenna.

Yet another similar communications device may include a battery, an NFC circuit device, and a power blocking dielectric layer removably positioned between the battery and the NFC circuit device. The power blocking dielectric layer may be configured to block powering of the NFC circuit device by the battery when positioned therebetween, and upon removal permit powering of the NFC circuit device by the battery.

A related method aspect is for making a communications device and may include adhesively coupling an RF signal blocking layer with a NFC circuit device. The RF signal blocking layer may be configured to block RF signal communication by the NFC circuit device while coupled therewith.

Figure 1:
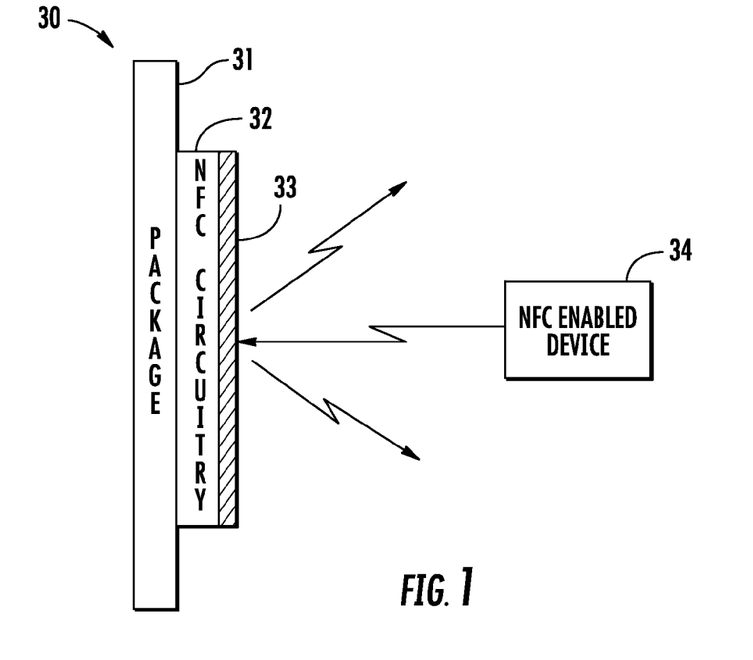
FIG. 1 is a schematic block diagram of a communications device in accordance with an example embodiment including a near-field communication (NFC) circuit device and a radio frequency (RF) signal blocking layer to block RF signal communication by the NFC circuit device.
Figure 2:
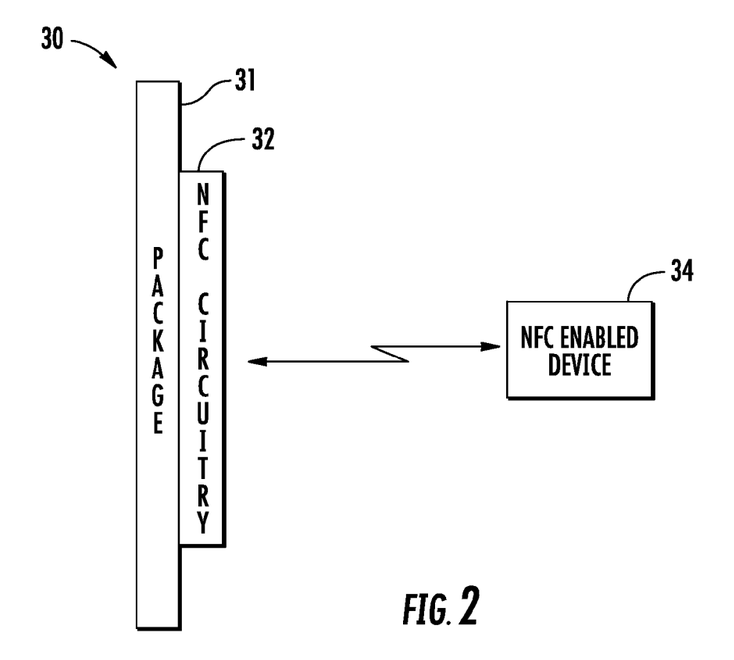
FIG. 2 is a schematic block diagram of the communications device of FIG. 1 with the RF signal blocking layer removed to permit RF signal communication by the NFC circuit device.

Referring initially to FIGS. 1 and 2, a communications device 30 illustratively includes a near-field communication (NFC) device including NFC circuitry 32 and a package 31 carrying the NFC circuitry 32. In the illustrated example, the package 31 comprises a substrate (e.g., plastic, dielectric, etc.) and the NFC circuitry 32 is shown carried on an exterior surface of the package 31, but in some embodiments the NFC circuitry 32 may be embedded or encased within the package 31, for example. The communications device 30 further illustratively includes a radio frequency (RF) signal blocking layer 33 adhesively coupled with the NFC circuit device. In particular, in this embodiment the RF signal blocking layer 33 is adhesively coupled to the NFC circuitry 32, but in some embodiments it may be coupled to the package 31, such as when the NFC circuitry 32 is embedded within the package 31, for example.

The RF signal blocking layer 33 is advantageously configured to block RF signal communication by the NFC circuitry 32 while coupled therewith (or to the package 31 in some embodiments). As shown in FIG. 1, this prevents an NFC enabled device 34 from communicating with the NFC circuitry 32, but NFC communication is enabled or permitted upon removal of the RF signal blocking layer 33 (FIG. 2). In some embodiments, the communications device 30 may further include one or more wireless communications circuits carried by the package 31, such as those of the communications subsystem 1001 described further below with reference to FIG. 9. The package 31 may take different forms in different embodiments, such as a card substrate, circuit board, portable device housing, etc.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

The use of the RF signal blocking layer 33 for the NFC circuitry 32 may be advantageous in various applications. Because of the relatively small dimensions in which NFC circuits or tags may be implemented, it is possible to use them in numerous product identification and security applications. For example, in retail sales applications, NFC tags may be embedded in coupons, gift cards, collectible cards or figures, etc. The information stored in the NFC tag may be associated with rebates, purchase points, or an account credit (e.g., a monetary credit, a digital media content or application download credit, etc.), for example. Thus, a designated user or recipient may use an NFC enabled device 34 to access the information, which may provide greater ease of use and convenience.

Nonetheless, because of the value of the information stored by such NFC tags, some may attempt to surreptitiously access these NFC tags to steal the information. The RF signal blocking layer 33 advantageously prevents the NFC circuitry 32, which may be implemented either as passive NFC circuitry or active NFC circuitry in various embodiments, from communicating until the RF signal blocking layer 33 is removed. Using an example where the communications device 30 is a gift card for loading credits onto a mobile device (e.g., mobile device application or "app" credits), the RF signal blocking layer 33 would advantageously prevent scanning of the gift card by someone other than the intended recipient. Moreover, if the RF signal blocking layer 33 was removed, then it would be visually evident that the card had been tampered with by someone other than the intended recipient.

Figure 3:
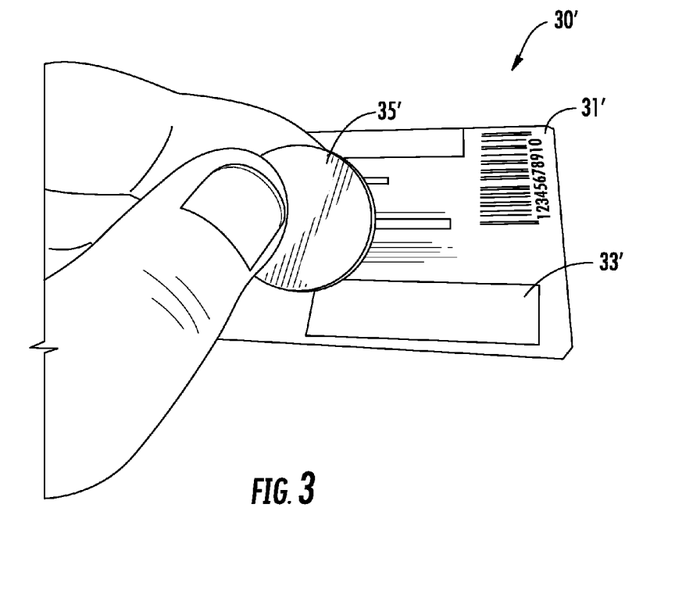
FIG. 3 is a perspective view of an example embodiment of the communications device of FIG. 1 including a frangible scratch-off RF signal blocking layer.

By way of example, the RF signal blocking layer 33 may comprise an electrical conductor. Referring more particularly to FIG. 3, in this example embodiment the RF signal blocking layer 33' is frangible, meaning that it separates, breaks, or otherwise comes off in pieces or sections. More particularly, the RF signal blocking layer 33' comprises a "scratch-off" layer, similar to those found on lottery tickets or game cards, but with conductive (e.g., metal) particulates therein that advantageously block RF signals. The RF signal blocking layer 33' may therefore easily be removed by scratching or rubbing with a coin 35', etc.

Figure 4:
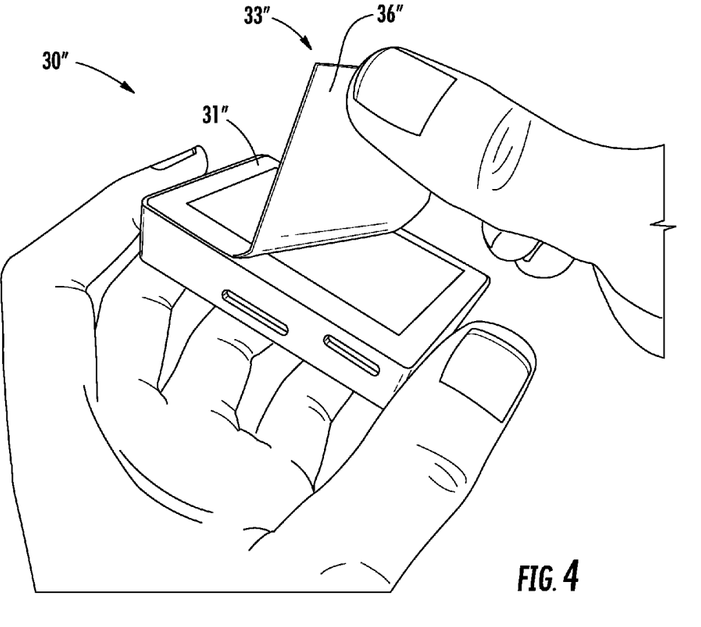
FIG. 4 is a perspective view of an example embodiment of the communications device of FIG. 1 including an adhesive peel-off RF signal blocking layer.

Another example is shown in FIG. 4, in which a pressure sensitive adhesive layer 36" may be included for adhesively securing the RF signal blocking layer 33" to the package 31" so that it may be peeled off of the package. In this example, the package 31" comprises a portable electronic device housing, and the pressure sensitive adhesive layer 36" and RF signal blocking layer 33" peel off as a single unitary body or piece (i.e., as a whole). However, in some embodiments perforations, etc., may be used so that the pressure sensitive adhesive layer 36" and RF signal blocking layer 33" combination is frangible, i.e., it comes apart when peeled off so that it may not be replaced in its original form. Considered alternatively, this destroys the RF signal blocking layer 33". Another approach is that the pressure sensitive adhesive layer 36" may comprise a single-use adhesive, which may not provide for easy reapplication of the RF signal blocking layer 33" once removed. Again, this may be used to help ensure that evidence of tampering cannot easily be hidden by reapplication of the RF signal blocking layer 33".

Figure 5:
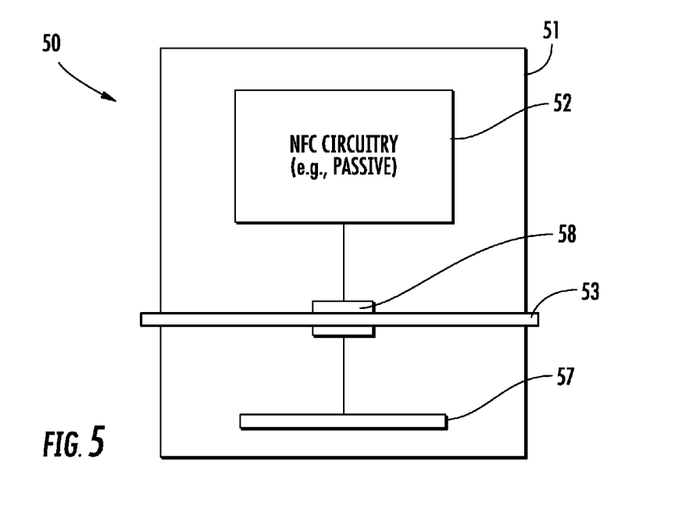
FIG. 5 is a schematic block diagram of a communications device in accordance with an alternative example embodiment including an RF signal blocking dielectric layer configured to block RF signal communication between NFC circuitry and an associated antenna.
Figure 6:
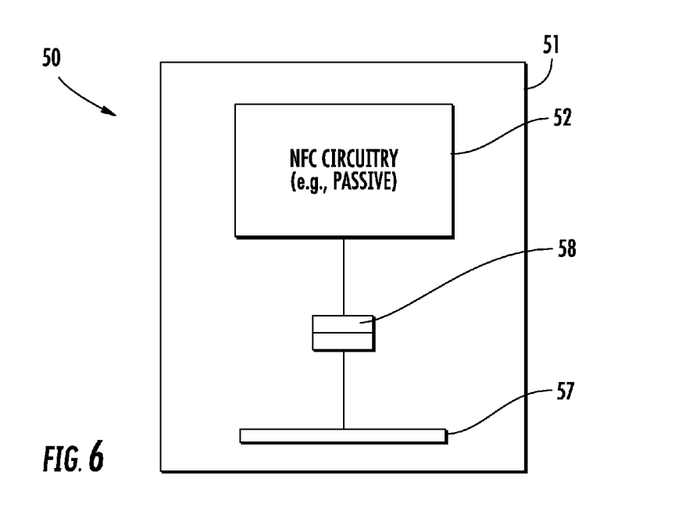
FIG. 6 is a schematic block diagram of the communications device of FIG. 5 with the RF signal blocking dielectric layer removed.

Another example embodiment of a communications device 50 is shown in FIG. 5. Here, NFC circuitry 52 (passive NFC circuitry in the illustrated example) is carried by a package 51, and an antenna 57 is also carried by the package 51. An electrical connector 58, such as a spring or bias clip, is used to electrically couple or connect the NFC circuitry 52 with the antenna 57. An RF signal blocking dielectric layer 53 is removably positioned or removably coupled to disrupt electrical contact between the NFC circuitry 52 and the antenna 57 at the electrical connector 58. The RF signal blocking dielectric layer 53 may comprise a dielectric strip or sheet of material that interrupts signal flow between the NFC circuitry 52 and the antenna 57 when positioned or coupled therebetween. As such, the RF signal blocking dielectric layer 53 similarly blocks (i.e., by preventing, limiting, obstructing, etc.) operation of the NFC circuitry 52 as does the RF signal blocking layer 33 described above, but through blocking of RF signals downstream of the antenna 57 instead of upstream (i.e., blocking the signals from reaching the antenna in the first place). Upon removal of the RF signal blocking dielectric layer 53 (FIG. 6), the electrical connector 58 then provides an electrical connection between the NFC circuitry 52 and the antenna 57 so that NFC communication may take place.

Figure 7:
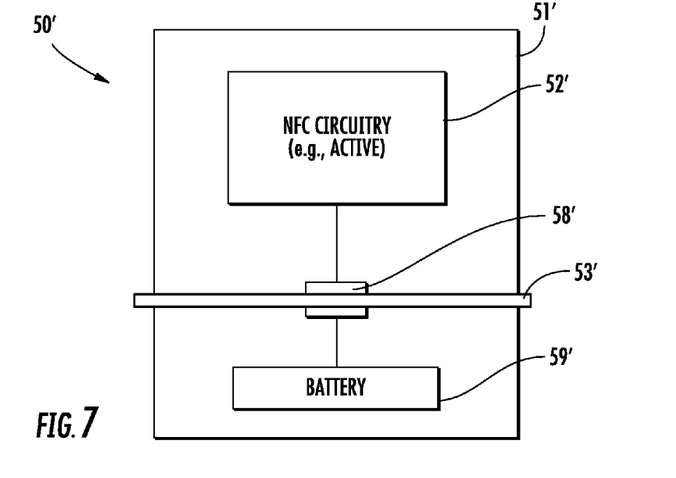
FIG. 7 is a schematic block diagram of a communications device in accordance with another alternative example embodiment including a power blocking dielectric layer configured to block powering of NFC circuitry by a battery.
Figure 8:
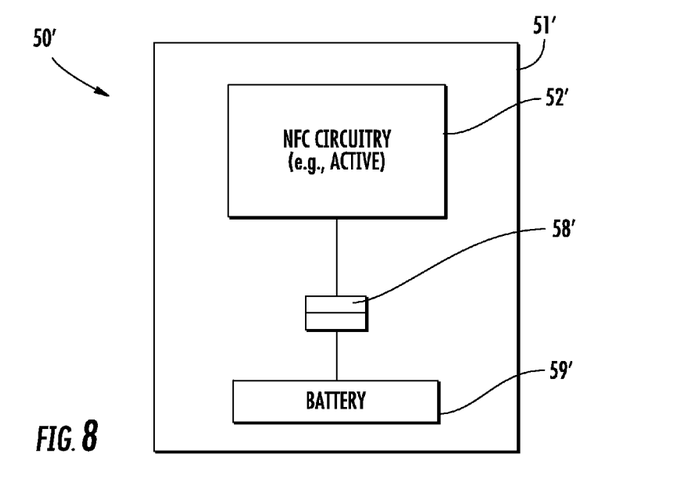
FIG. 8 is a schematic block diagram of the communications device of FIG. 7 with the power blocking dielectric layer removed.

Referring additionally to FIGS. 7 and 8, yet another example implementation of the communications device 50' may include a battery 59' carried by the package 51', and a power blocking dielectric layer 53' removably coupled or positioned between the battery and the NFC circuitry 52'. In this case, the NFC circuitry 52' comprises active NFC circuitry, and coupling or positioning of the power blocking dielectric layer 53' between the NFC circuitry and the battery 59' at the electric connector 58' advantageously prevents powering of the NFC circuitry. Upon removal of the power blocking dielectric layer 53' (FIG. 8), powering of the NFC circuitry 52' by the battery 59' may occur.

Example components of a communications device 1000 that may further be used in accordance with the above-described embodiments are now described with reference to FIG. 9. The device 1000 illustratively includes a housing 1200, a keypad or keyboard 1400 and an output device 1600.

The output device shown is a display 1600, which may comprise a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400.

The housing 1200 may be elongated vertically, or may take on other sizes and shapes (including clamshell housing structures). The keyboard may include a mode selection key, or other hardware or software for switching between text entry and telephony entry.

Figure 9:
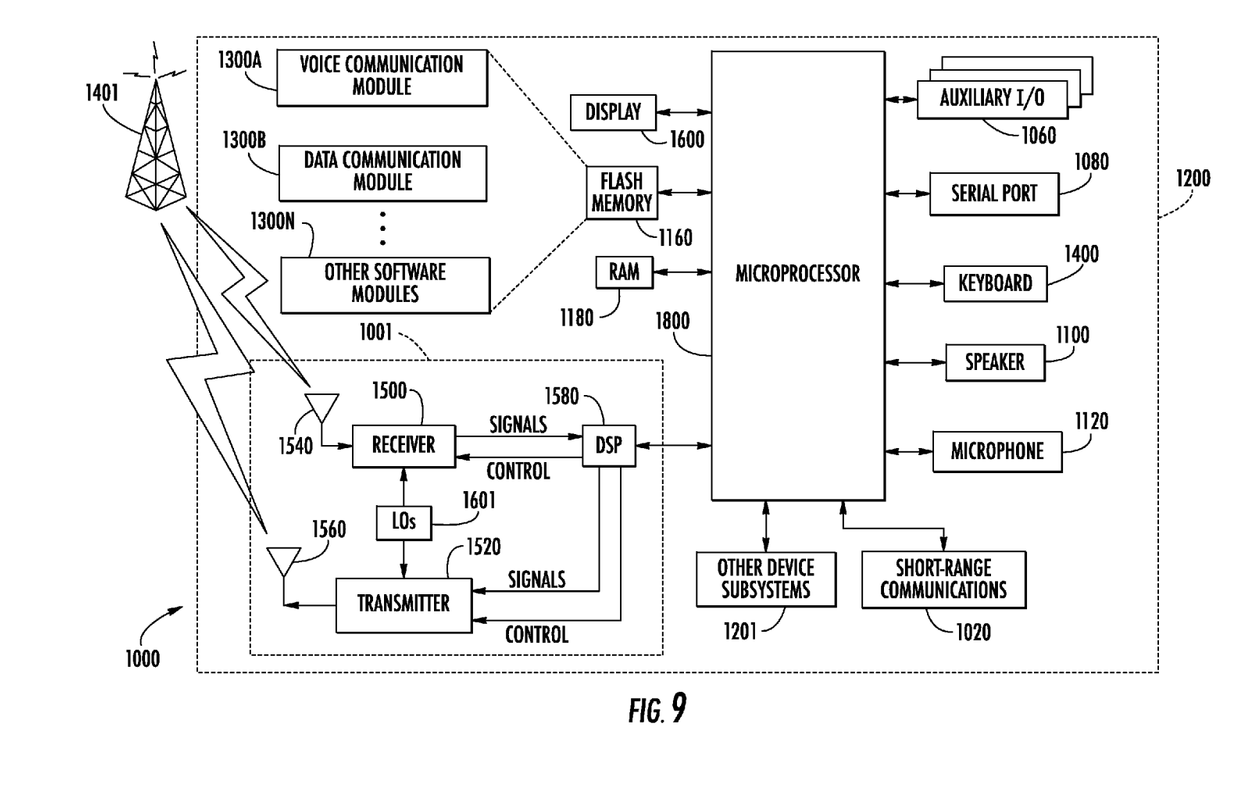
FIG. 9 is a schematic block diagram illustrating example components which may used in the communications devices of FIGS. 1 through 8.

In addition to the processing device 1800, other parts of the mobile device 1000 are shown schematically in FIG. 9. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem 1020 may include an infrared device and associated circuits and components, NFC or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A device comprising:
a near-field communication (NFC) device; and
a radio frequency (RF) signal blocking member being removably coupled with said NFC device to block RF signal communication with said NFC device;
said RF signal blocking member being frangible to come apart in pieces when removed from said NFC device.

2. The device of claim 1 wherein said RF signal blocking member comprises an electrically conductive material.

3. The device of claim 1 further comprising an adhesive layer removably coupling said RF signal blocking member to said NFC device.

4. The device of claim 1 wherein said RF signal blocking member comprises a scratch off matrix and a plurality of electrically conductive particles therein.

5. The device of claim 1 wherein said NFC device comprises NFC circuitry and an antenna coupled therewith.

6. The device of claim 5 wherein said RF blocking member overlies said antenna.

7. The device of claim 1 wherein said NFC device comprises active NFC circuitry.

8. The device of claim 1 wherein said NFC device comprises passive NFC circuitry.

9. The device of claim 1 wherein said NFC device comprises a package and NFC circuitry carried by said package; and further comprising a wireless communications circuit carried by said package.

10. The device of claim 1 wherein said NFC device has stored therein information relating to at least one of a rebate, a purchase point, a monetary credit, a digital media content credit, and an application download credit.

11. A device comprising:
a near-field communication (NFC) device having stored therein information relating to at least one of a rebate, a purchase point, a monetary credit, a digital media content credit, and an application download credit; and
a radio frequency (RF) signal blocking member being removably coupled with said NFC device and comprising a material to block RF signal communication with said NFC device;
said RF signal blocking member being frangible to come apart in pieces when removed from said NFC device.

12. The device of claim 11 wherein said RF signal blocking member comprises an electrically conductive material.

13. The device of claim 11 further comprising an adhesive layer removably coupling said RF signal blocking member to said NFC device.

14. The device of claim 11 wherein said RF signal blocking member comprises a scratch off matrix and a plurality of electrically conductive particles therein.

15. The device of claim 11 wherein said NFC device comprises NFC circuitry and an antenna coupled therewith; and wherein said RF blocking member overlies said antenna.

16. The device of claim 11 wherein said NFC device comprises a package and NFC circuitry carried by said package; and further comprising a wireless communications circuit carried by said package.

17. A method for making a device comprising:
removably coupling a radio frequency (RF) signal blocking member with a near-field communication (NFC) device to block RF signal communication with the NFC device, and with the RF signal blocking member being frangible to come apart in pieces when removed from the NFC device.

18. The method of claim 17 wherein the RF signal blocking member comprises an electrically conductive material.

19. The method of claim 17 wherein removably coupling comprises removably coupling using an adhesive layer.

20. The method of claim 17 wherein the RF signal blocking member comprises a scratch off matrix and a plurality of electrically conductive particles therein.

21. The method of claim 17 wherein the NFC device comprises NFC circuitry and an antenna coupled therewith; and wherein removably coupling comprises removably coupling so that the RF blocking member overlies the antenna.

22. The method of claim 17 wherein the NFC device comprises a package and NFC circuitry carried by the package; and further comprising a wireless communications circuit carried by the package.

23. The method of claim 17 wherein the NFC device has stored therein information relating to at least one of a rebate, a purchase point, a monetary credit, a digital media content credit, and an application download credit.

* * * * *